UNITED STATES PATENT OFFICE.

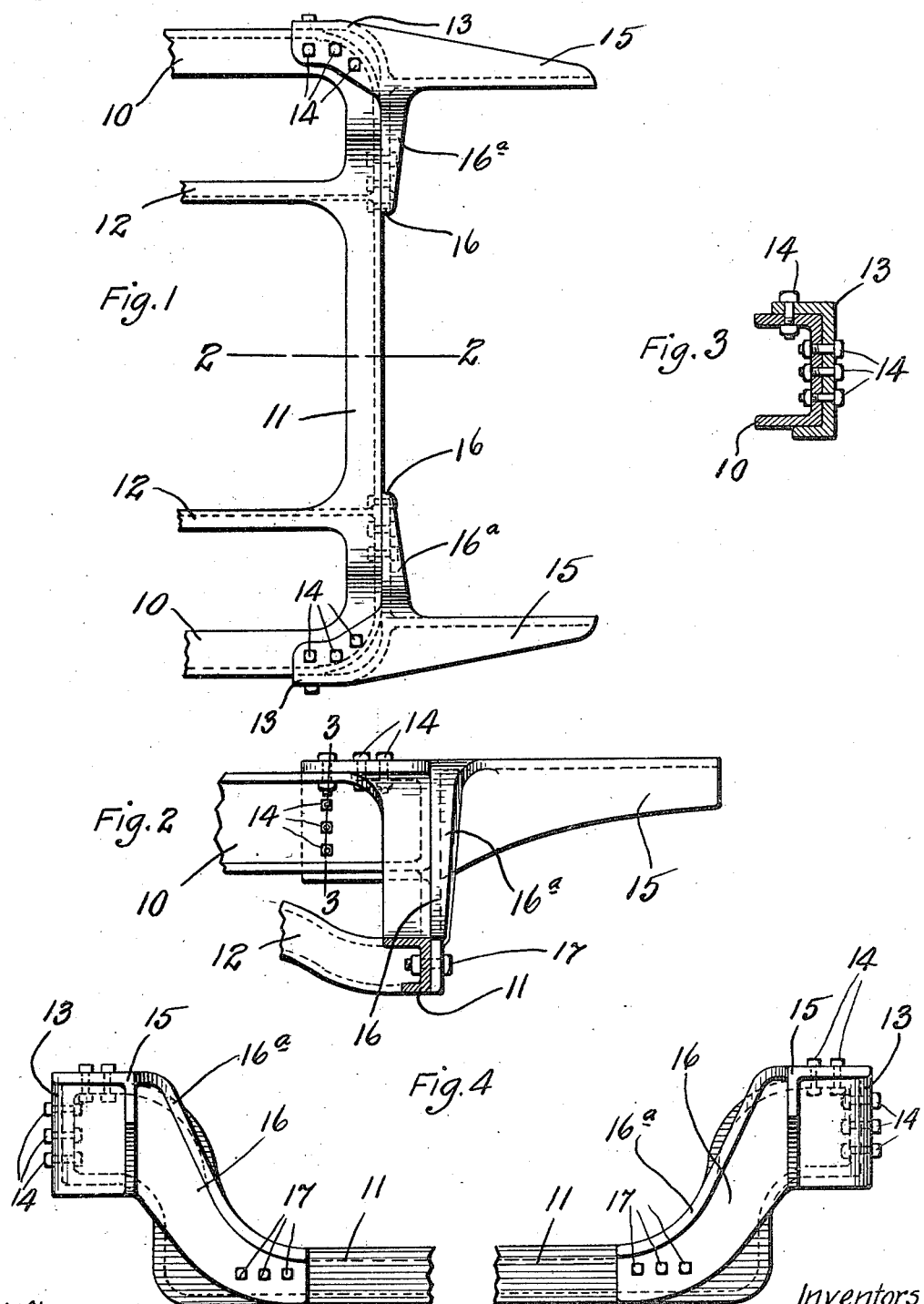

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

DYNAMO-SUSPENSION BAR FOR CAR-TRUCKS.

1,068,657.  Specification of Letters Patent.  Patented July 29, 1913.

Application filed March 1, 1913. Serial No. 751,455.

*To all whom it may concern:*

Be it known that we, CLARENCE H. HOWARD and HARRY M. PFLAGER, citizens of the United States, residing at St. Louis, Missouri, have invented a certain new and useful Improvement in Dynamo-Suspension Bars for Car-Trucks, of which the following is a full, clear, and exact description, such as will enable others skilled in the art to which it appertains to make and use the same, reference being had to the accompanying drawings, forming part of this specification, in which—

Figure 1 is a plan view of the end portion of a car truck, and showing our improved dynamo suspension bars or brackets positioned thereon. Fig. 2 is an enlarged sectional view taken approximately on the line 2—2 of Fig. 1. Fig. 3 is a cross-sectional view taken approximately on the line 3—3 of Fig. 2. Fig. 4 is an end elevation of a car truck equipped with our improved dynamo suspension bars or brackets.

Our invention relates to new and useful improvements in bars or brackets utilized upon car trucks for supporting the axle-driven generator or dynamo which supplies current for the car lighting system, the principal object of our invention being to construct a bracket in a single piece, preferably by casting, which bracket is strong and durable and of such form as to be readily combined with the end portion of the truck, and said bracket having an integral brace member arranged and connected to the truck frame so as to transmit thereto a considerable portion of the load carried by the main supporting arm of the bracket.

A further object of our invention is to provide dynamo suspension bars or brackets which can be easily and quickly placed in position upon or removed from a car truck.

To the above purposes our invention consists in certain features of novelty hereinafter more fully described and claimed.

In the drawings we have shown a metal truck frame having the usual wheel pieces 10, end rail 11 and wheel guards 12, but it will be understood that our improved dynamo suspension bars or brackets can be utilized in connection with other types of truck frames.

The main body portion 13 of our improved bar or bracket is in the form of a short, channel-shaped member of such size and form as to fit snugly upon the end portion of the wheel piece 10 with the horizontally disposed flanges of said channel-shaped member 13 bearing directly against the top and bottom flanges of said wheel piece. The member 13 is rigidly fixed to the end of the wheel piece by means of bolts 14, or like fastening devices, which pass through the vertically disposed web of said member and the top flange thereof and through the corresponding parts of the wheel piece.

Formed integral with and projecting outwardly from the member 13 is a horizontally disposed arm 15 which is preferably of inverted L-shape in cross section, and said arm being designed to receive the transversely disposed pair of bars carrying the dynamo.

Formed integral with the arm 15 and the member 13 at the end or point where the same are united, is an inwardly and downwardly extending brace member 16 which lies directly against the outer face of the end rail 11, and said brace member is fixed to said end rail by means of bolts 17, or like fastening devices.

In the type of truck frame shown the central portion of the end rail 11 is depressed in order to accommodate a comparatively deep center sill or girder, and thus the inwardly projecting brace members 16 are diagonally disposed with respect to the plane occupied by the body member 13 and arm 15, but it will be readily understood that, where the end rail 11 occupies substantially the same horizontal plane with the wheel pieces 10, that the brace member 16 will be extended inwardly in practically a horizontal plane so as to bear directly against and be attached to the end rail 11. The brace member 16 is preferably provided with a flange 16ª along its upper edge for strengthening purposes, and if desired, a second flange may be formed along the lower edge of said brace member.

Brackets or suspension bars of our improved construction are formed preferably by casting, and therefore said brackets can be easily and cheaply produced. The body portions 13 fit snugly around the end portions of the wheel pieces 10, thereby providing firm and rigid supports for the integral arms 15 which carry the dynamo, and these arms are further braced and supported by the members 16 which bear directly against the end rail of the truck frame.

It will be readily understood that minor changes in the size, form and construction of the various parts of our improved bar or bracket can be made and substituted for those herein shown and described without departing from the spirit of our invention, the scope of which is set forth in the appended claims.

We claim:

1. A dynamo supporting bracket for truck frames comprising a horizontally disposed arm, one end of which is adapted to be attached to the end portion of the wheel piece of the truck frame, and a brace member formed integral with said arm and bearing against the end rail of the truck frame.

2. A dynamo suspension bracket comprising a flanged body portion adapted to be applied to the wheel piece of the truck frame, a flanged arm integral with said body portion, and a flanged brace member integral with said body member and arm, which brace member is adapted to bear against the end rail of the truck frame.

3. A dynamo suspension bracket for car trucks comprising a channel-shaped body member adapted to be applied to the end of the wheel piece of a truck frame, an arm integral with the said channel-shaped body portion, and a brace member integral with said arm, which brace member is adapted to be attached to the end rail of the truck frame.

4. The combination with a car truck frame, of dynamo supporting brackets applied to the ends of the wheel pieces of said truck frame, and braces integral with said brackets, which braces are arranged substantially at right angles to said arms and are adapted to be fixed to the end piece of the truck frame.

5. A dynamo suspension bracket for car trucks comprising integral members adapted to be fixed to the corner of a car truck frame and bear against the wheel piece and end rail of said truck frame, and a horizontally disposed arm integral with said members.

6. A dynamo suspension bracket for car trucks comprising a horizontally disposed member, one end of which is flanged and adapted to be applied to the wheel piece of the truck frame, and a brace member integral with said first mentioned member and adapted to be applied to the end rail of the truck frame.

7. A dynamo suspension bracket for car trucks comprising a horizontally disposed member, one end of which is channel-shaped and adapted to be applied to the corner of the car truck frame, and a brace member integral with said first mentioned member, which brace member is adapted to be applied to the end rail of the car truck frame.

8. A dynamo suspension bracket for car trucks comprising a horizontally disposed flanged member, adapted to support a transversely arranged dynamo supporting rail and an integral brace member extending laterally and downwardly from said horizontally disposed member for attachment to a fixed part of the car truck.

In testimony whereof we hereunto affix our signatures in the presence of two witnesses, this 19th day of February, 1913.

CLARENCE H. HOWARD.
HARRY M. PFLAGER.

Witnesses:
HAL C. BELLVILLE,
FRED H. BLANKENHAM.

Copies of this patent may be obtained for five cents each, by addressing the "Commissioner of Patents, Washington, D. C."